Patented Dec. 23, 1941

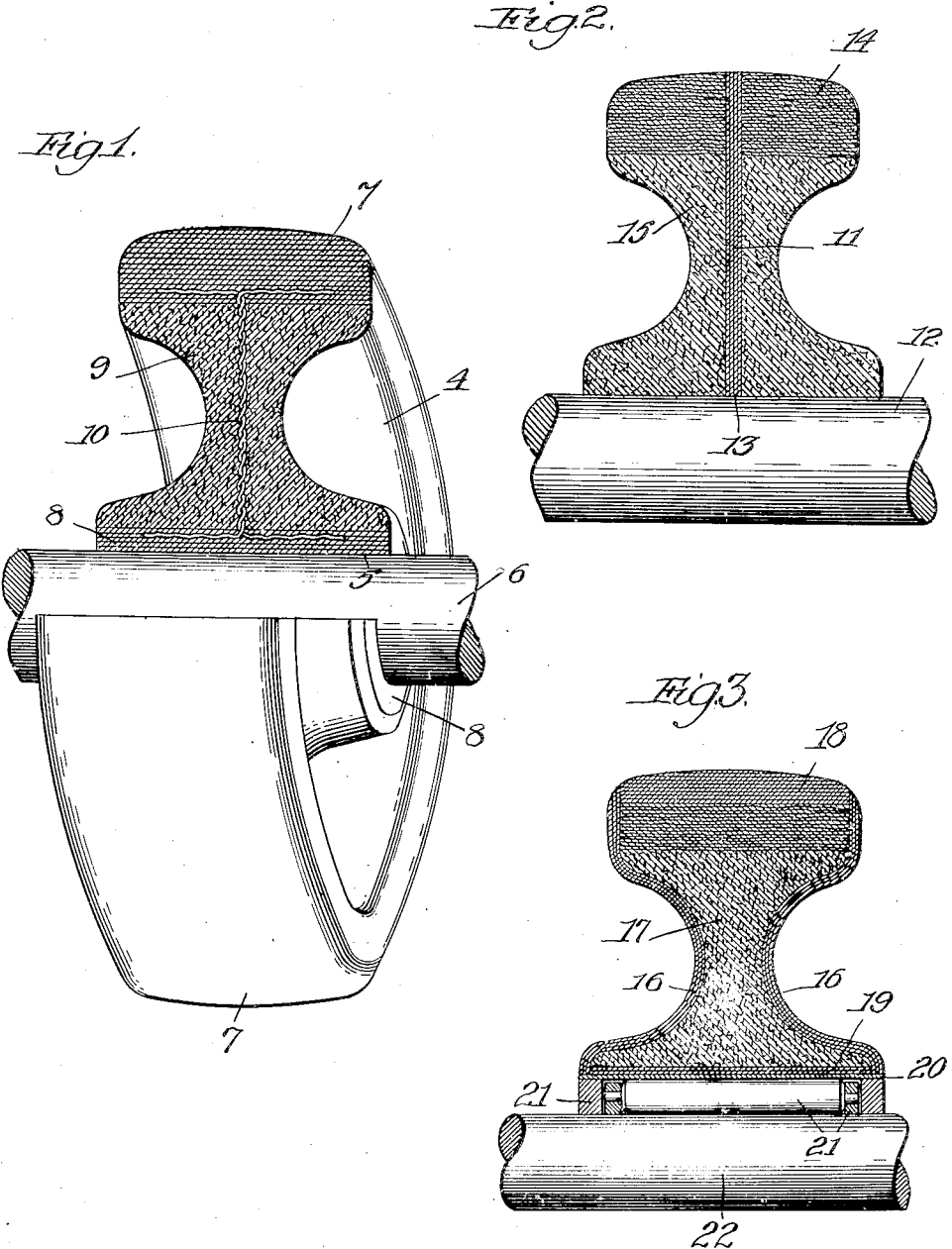

2,267,503

UNITED STATES PATENT OFFICE 2,267,503

ELECTROCONDUCTIVE WHEEL

Robert W. Lytle, Cincinnati, Ohio, assignor to The Formica Insulation Company, a corporation of Ohio Application February 15, 1941, Serial No. 379,119

8 Claims. (Cl. 301—63)

This invention relates to wheels, and more particularly to wheels made largely from insulating material and provided with means for conducting static electricity from the axle of a vehicle to the ground.

The primary object of the invention is to provide an improved wheel for a hand propelled truck which may be used in powder factories, powder loading plants, or anywhere in the vicinity of explosive material which might be set off by a spark.

It is well known that wheels made of hard metals, such as iron or steel, will spark when they hit an abrasive of the type frequently encountered on factory floors. Such sparking through impact can be avoided by use of tires of insulating material, such as rubber, but a rubber tire provides no means for discharging static electricity that may accumulate on the truck.

In carrying out the present invention, a molded wheel of laminated material is impregnated with a heat-hardenable binder such as phenol formaldehyde resin, or the like, and an electric conductor such as wire, tin foil, or coatings of powdered electrical conducting material, such as graphite, is incorporated within the body of the wheel to conduct electric current from a shaft in the bore of the hub to the rim. If powdered electrical conducting material is used, it is applied to the fabric before the fabric is impregnated with the binder. Then the laminations are consolidated under heat and pressure to render the binder hard and substantially insoluble. Wheels formed in this manner prevent static electricity from accumulating in the frame of the vehicle and thereby eliminate much of the fire and explosive hazard that is present with ordinary wheels.

A wheel of such "Formica" material has excellent wearing qualities and is not damaged by water, oil, or most chemicals.

The invention is illustrated in the accompanying drawing, in which—

Figure 1 is a fragmentary perspective view, partly in section, showing the preferred design; Figure 2, a fragmentary sectional view showing a modified arrangement; and Figure 3, a fragmentary sectional view showing a further modification in the structure of the wheel.

In the embodiment illustrated in Figure 1, a wheel 4 having a bore 5 is journalled on a metal shaft 6. Some of the laminations in the rim 7 and the hub 8 are formed of woven fabric, such as canvas, which is coated with a finely divided conducting material such as colloidal graphite. Where graphite is used, it has been found that where the graphite comprises about 7% of the weight of the fabric, satisfactory results would be obtained. The fabric is then impregnated with a heat-hardenable binder, such as a phenol formaldehyde type of resin, and the sheets are dried and placed in a mold. The web portion 9 is shown formed of macerated fabric, impregnated with the binder. A plurality of soft metal wires 10 are embedded in the web portion and preferably have their ends extended so as to lie between the laminations in the rim and hub. The assembly is then consolidated under heat and pressure to render the binder hard and substantially insoluble. The use of a soft metal wire or cable made of copper, or the like, has the advantage that there is no danger of it being ruptured under adverse conditions in the molding process. Obviously, the shearing off of the conductor would make the purpose of the wheel inoperative and for that reason it is preferred to use a plurality of twisted conductors rather than depending entirely upon one conductor.

In the modification shown in Figure 2, a plurality of laminations 11, incorporating electrical conducting material, are radially disposed in the center of the wheel. The inner ends of the conductors are adapted to contact the shaft 12, as indicated at 13, while the outer portions of the laminations are in contact with the conducting laminations 14. The web portion 15 may be made of sheets of fabric or macerated material impregnated with the binder in which no conducting material has been incorporated.

In the form shown in Figure 3, conducting laminations 16 embrace the non-conducting portion 17 and make electrical contact with the conducting rim laminations 18 and the hub conducting laminations 19 which contact a metal bushing 20. A roller bearing 21 is shown on the shaft 22.

Another method of making some of the laminations electrically conductive is to incorporate colloidal graphite in the varnish which is used to impregnate the fabric sheets. However, this method is not so convenient to manufacture. Where such conductive material is introduced into the reactive varnish, it occupies more space and reduces the physical strength of the solidified binder.

The foregoing detailed description has been given for clearness of understanding only, and no unnecessary limitations should be understood therefrom for some modifications will be obvious to those skilled in the art.

I claim:

1. A molded electroconductive wheel comprising: a rim portion of laminations of fabric coated with a powdered electrical conducting material and impregnated with a binder which hardens under heat; a web and hub portion of fibrous material impregnated with a binder which hardens under heat; and electrical conducting means extending from said rim laminations to the bore in the hub portion, said wheel having been consolidated under heat and pressure and having had the binder transformed into a hard, substantially insoluble condition.

2. A molded electroconductive wheel comprising: a rim portion of laminations of fabric coated with a powdered electrical conducting material and impregnated with a binder which hardens under heat; a hub portion formed of laminations of material similar to that of the rim portion; a web of fibrous material impregnated with a heat-hardenable binder; and electrical conducting means embedded in the web portion and extending from the rim laminations to the hub laminations, said wheel having been consolidated under heat and pressure.

3. A truck wheel as specified in claim 2, in which the electrical conducting means comprises a continuous strip of soft metal.

4. A truck wheel as specified in claim 2, in which the electrical conducting means comprises laminations of fabric coated with colloidal graphite and impregnated with a heat-hardenable binder.

5. A molded electroconductive truck wheel comprising: rim and hub portions of woven fabric laminations coated with a powdered electrical conducting material and impregnated with a heat-hardenable binder; a web portion of laminations of woven fabric impregnated with a heat-hardenable binder; and a soft metal wire embedded in the web portion and electrically connecting the rim and hub laminations, the wheel having been consolidated under heat and pressure and the binder having been transformed into its final substantially insoluble condition.

6. A wheel as specified in claim 5, in which the rim and hub laminations are coated with colloidal graphite in the amount of about 7% by weight of the woven fabric in the lamination.

7. A molded electroconductive truck wheel of laminated material impregnated with a heat-hardenable binder, a plurality of said laminations being coated with colloidal graphite and extending from the rim of the wheel to the bore in the hub, said wheel having been consolidated under heat and pressure to render the binder hard and substantially insoluble.

8. A molded electroconductive truck wheel comprising: rim and hub portions formed of laminations of woven fabric coated with about 7% by weight of colloidal graphite and impregnated with a heat-hardenable binder; a web portion of fibrous material impregnated with a similar binder; and twisted copper wires embedded in the web portion and extending from the rim to the hub laminations, said wheel having been consolidated under heat and pressure.

ROBERT W. LYTLE.